(12) United States Patent
Gupta et al.

(10) Patent No.: US 10,259,711 B2
(45) Date of Patent: Apr. 16, 2019

(54) PRESSURE SWING ADSORPTION FOR OXYGEN PRODUCTION

(71) Applicant: ExxonMobil Research and Engineering Company, Annandale, NJ (US)

(72) Inventors: Ramesh Gupta, Berkley Heights, NJ (US); Robert A. Johnson, Doylestown, PA (US); Thomas N. Anderson, Conroe, TX (US); Harry W. Deckman, Clinton, NJ (US); Peter I. Ravikovitch, Princeton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 119 days.

(21) Appl. No.: 15/465,666

(22) Filed: Mar. 22, 2017

(65) Prior Publication Data

US 2017/0305744 A1   Oct. 26, 2017

Related U.S. Application Data

(60) Provisional application No. 62/324,978, filed on Apr. 20, 2016.

(51) Int. Cl.
*B01D 53/047* (2006.01)
*B01D 53/06* (2006.01)
*C01B 13/02* (2006.01)

(52) U.S. Cl.
CPC .......... *C01B 13/027* (2013.01); *B01D 53/047* (2013.01); *B01D 53/06* (2013.01);
(Continued)

(58) Field of Classification Search
CPC .................. B01D 53/047; B01D 53/06; B01D 2253/108; B01D 2253/342;
(Continued)

(56) References Cited

U.S. PATENT DOCUMENTS 3,907,310 A * 9/1975 Dufour ................ F16J 15/3452
165/9
5,370,728 A   12/1994 LaSala et al.
(Continued)

FOREIGN PATENT DOCUMENTS

EP          0042159 A1     12/1981

OTHER PUBLICATIONS

Smith et al., "A review of air separation technologies and their integration with energy conversion processes", Fuel Processing Technology, May 2001, pp. 115-134, vol. 70, iss. 2, Elsevier Science B.V.
(Continued)

*Primary Examiner* — Frank M Lawrence, Jr.
(74) *Attorney, Agent, or Firm* — Priya G. Prasad

(57) ABSTRACT

Systems and methods are provided for separating oxygen from air using a sorption/desorption cycle that includes a reduced or minimized difference between the maximum and minimum pressures involved in the sorption/desorption cycle. The reduced or minimized difference in pressures can be achieved in part by using valves that can allow for commercial scale flow rates while avoiding large pressure drops for flows passing through the valves. A rotary wheel adsorbent is an example of a system that can allow for a sorption/desorption cycle with reduced and/or minimized pressure drops across valves associated with the process. Stationary adsorbent beds can also be used in combination with commercially available valves that have reduced and/or minimized pressure drops.

8 Claims, 6 Drawing Sheets

(52) U.S. Cl.
CPC .. *B01D 2253/108* (2013.01); *B01D 2253/342* (2013.01); *B01D 2256/12* (2013.01); *B01D 2257/102* (2013.01); *B01D 2257/40* (2013.01); *B01D 2259/4003* (2013.01); *B01D 2259/40052* (2013.01); *C01B 2210/0018* (2013.01); *C01B 2210/0046* (2013.01); *C01P 2006/80* (2013.01)

(58) Field of Classification Search
CPC .......... B01D 2256/12; B01D 2257/102; B01D 2257/40; B01D 2259/4003; B01D 2259/40052; C01B 13/027; C01B 2210/0018; C01B 2210/0046; C01P 2006/80
USPC .......................... 95/97, 98, 113, 130; 96/125
See application file for complete search history.

(56) References Cited

U.S. PATENT DOCUMENTS

| | | | |
|---|---|---|---|
| 5,656,067 A | 8/1997 | Watson et al. | |
| 5,656,068 A | 8/1997 | Smolarek et al. | |
| 5,658,371 A | 8/1997 | Smolarek et al. | |
| 6,029,462 A * | 2/2000 | Denniston | F24S 23/30 62/94 |
| 8,974,576 B2 | 3/2015 | Gupta et al. | |
| 2013/0140777 A1* | 6/2013 | Erb | F16J 15/3288 277/578 |
| 2014/0175336 A1 | 6/2014 | Gupta et al. | |

OTHER PUBLICATIONS

Shelley, Suzanne, ed. "Oxygen and Nitrogen: Onward and Upward" Chemical Engineering Progress Jan. 2009.

Rege et al., "Limits for Air Separation with LiX Zeolite", Industrial & Engineering Chemistry Research, 1997, pp. 5358-5365, vol. 36, iss. 12, ACS Publications.

Barron, "Cryogenic Systems", 1966, pp. 230-255, Chapter 4.10, McGraw Hill.

International Search Report and Written Opinion PCT/US2017/023517 dated Sep. 15, 2017.

PCT/US2017/023517 Invitation to Pay Additional Fees dated Jul. 24, 2017.

* cited by examiner

PRESSURE SWING ADSORPTION FOR OXYGEN PRODUCTION

CROSS-REFERENCE TO RELATED APPLICATIONS

This application claims priority to U.S. Provisional Application Ser. No. 62/324,978 filed on Apr. 20, 2016, herein incorporated by reference in its entirety.

FIELD

Systems and methods are provided for production of oxygen enriched streams.

BACKGROUND

In many petroleum and chemical processes it can be desirable to use enriched oxygen instead of air. Examples of such processes include the Claus process for recovery of elemental sulfur from $H_2S$ containing streams, and the GTL process for producing liquid hydrocarbons from natural gas. Enriched oxygen (typically 30-80% $O_2$) can improve process efficiency in several ways including elimination of inert $N_2$ heating to process temperature and a reduction in flow volumes and equipment size. In such processes, the capital investments for the oxygen plant can be very large, often exceeding a ¼ or even ⅓ of the total plant costs. Thus, reducing or minimizing the cost of the air separation technology used to form enriched oxygen can provide a substantial benefit. In addition to investment, other considerations, such as energy requirements, plant footprint, process reliability and safety also contribute towards the selection of air separation technology.

The two current commercially used air separation technologies either use distillation of oxygen from nitrogen at cryogenic temperatures, or pressure (or vacuum) swing adsorption using a $N_2$ selective adsorbent (the vacuum pressure swing adsorption (VPSA) process has mostly replaced the older pressure swing process in recent years).

Cryogenic air separation process permits a better economy of scale than the VPSA process. The capacity of a commercial VPSA unit is generally limited to less than about 200 tons per day (TPD) of oxygen whereas the capacities of cryogenic air separation units can be much higher and can approach 5000 TPD or even higher. Modern large scale plants generally require more than 1000 TPD of enriched oxygen. Thus, VPSA technology is at a disadvantage in large commercial plants because of its unfavorable economy of scale. In addition to an unfavorable economy of scale, the VPSA process also has a larger footprint and requires more maintenance because of the periodic frequent maintenance of the flow switching valves.

U.S. Patent Application Publication 2014/0175336 describes systems and methods for using rotary wheel sorption-desorption to separate $CO_2$ from various streams, such as flue gas streams. The rotary wheel corresponds to a solid monolith that can selectively sorb $CO_2$. Optionally, two or more rotary wheels can be used in conjunction so that, during various sorption and/or desorption steps, the output flow from a first wheel can be used as (at least part of) an input flow for a second wheel.

U.S. Pat. No. 8,974,576 describes a continuous or semi-continuous, cyclic, countercurrent sorption-desorption method for enhanced control, separation, and/or purification of $CO_2$ gas from one or more sources of a mixture of gases through integrated use of solid monolithic sorbents having sorption selectivity for $CO_2$.

SUMMARY

In one aspect, a method for forming an oxygen-enriched product is provided. The method can include exposing an input fluid comprising at least about 50% $N_2$ and about 10 vol % to about 30 vol % $O_2$ to an adsorbent at a first pressure to form an oxygen-enriched product. The oxygen-enriched product can optionally have an oxygen concentration or purity of at least about 30 vol % $O_2$, such as at least about 50 vol % and/or about 80 vol % or less. The adsorbent can correspond to an adsorbent selective for adsorption of $N_2$. The adsorbent can have a first loading of $N_2$ at an end of the exposing the input fluid. In some aspects, the first loading can correspond to a loading achieved after breakthrough of $N_2$ during the exposing. Optionally, after achieving the first loading, the adsorbent can be vented to form a first vent product at a third pressure. The first vent product can have a vol % of $O_2$ greater than the vol % of $O_2$ of the input fluid. Optionally, the third pressure can be lower than the first pressure by at least about 0.2 bar (~20 kPa). The adsorbent can then be exposed to a purge fluid at a second pressure to form a desorption product. The purge fluid can have a vol % of $O_2$ greater than the vol % of $O_2$ of the input fluid at a second pressure. Optionally, the second pressure can be lower than the first pressure by at least about 0.4 bar (~40 kPa). Optionally, the second pressure can be lower than the third pressure by at least about 0.2 bar (~20 kPa). The adsorbent can have a second loading of $N_2$ at an end of the exposing the purge fluid, the second loading of $N_2$ being less than the first loading of $N_2$. The adsorbent can then be repressurized to the first pressure, for example with the input fluid. Optionally, a difference between the first pressure and the second pressure can be less than about 4 bar (400 kPa), or less than about 300 kPa, or less than about 250 kPa, or less than about 200 kPa. In some aspects, the adsorbent can correspond to a rotary wheel adsorbent.

The above method can be conveniently used in a variety of pressure operating ranges. As one example, the first pressure can be about 2.0 bar-a (~200 kPa) to about 5.0 bar-a (~500 kPa). As another example, the first pressure can be about 1.0 bar-a (~100 kPa) to about 3.0 bar-a (~300 kPa) and the second pressure can be about 0.01 bar-a (~1 kPa) to about 0.9 bar-a (~90 kPa). As still another example, the first pressure and the second pressure can be between about 40 kPa-a and about 200 kPa-a.

In another aspect, a system for forming an enriched oxygen product is provided. The system includes a rotary wheel adsorbent comprising an adsorbent selective for adsorption of $N_2$. The rotary wheel adsorbent can be mounted to rotate through a plurality of angular zones. A plurality of brush seals in contact with a surface of the rotary wheel adsorbent can define the plurality of angular zones. For example, a contact of a first brush seal with the surface of the rotary wheel can be suitable for maintaining a pressure difference between a first angular zone and a fourth angular zone of at least 0.2 bar (~20 kPa). As another example, a contact of a second brush seal with the surface of the rotary wheel can be suitable for maintaining a pressure difference between a second angular zone and a third angular zone of at least 0.5 bar (~50 kPa). A first inlet can allow for delivery an input fluid. A second inlet can allow for delivery of a purge fluid. The system can further include one or more vent outlets and a product outlet. Optionally, at least one vent outlet can be in fluid communication with the second inlet.

DETAILED DESCRIPTION OF THE EMBODIMENTS

Overview

Figure 1:
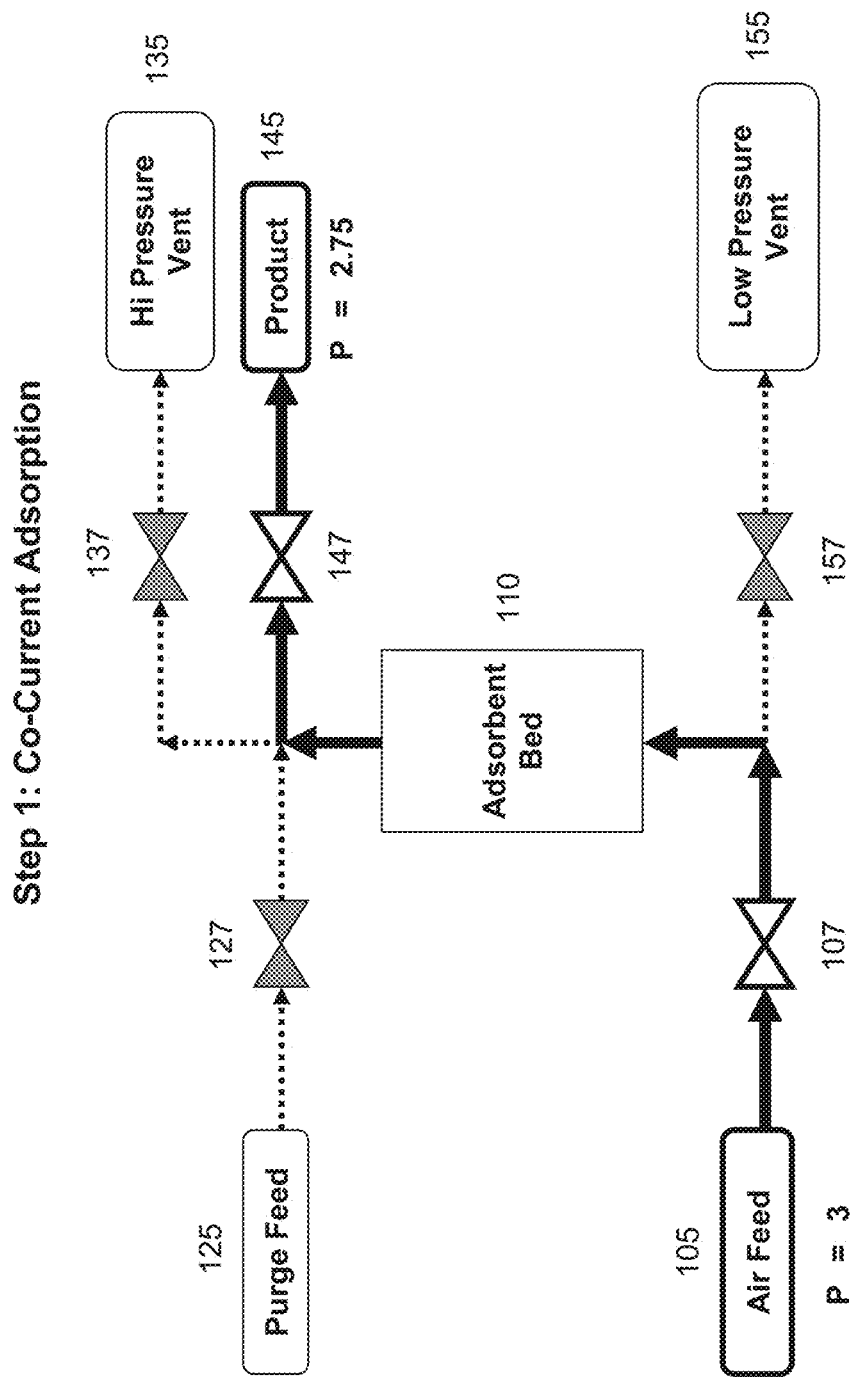
FIG. 1 schematically shows an example of a process step from a sorption/desorption cycle.

In various aspects, systems and methods are provided for separating oxygen from air using a sorption/desorption cycle that includes a reduced or minimized difference between the maximum and minimum pressures involved in the sorption/desorption cycle. The reduced or minimized difference in pressures can be achieved in part by using valves that can allow for commercial scale flow rates while avoiding large pressure drops for flows passing through the valves. A rotary wheel adsorbent is an example of a system that can allow for a sorption/desorption cycle with reduced and/or minimized pressure drops across valves associated with the process. Stationary adsorbent beds can also be used in combination with commercially available valves that have reduced and/or minimized pressure drops.

In some aspects, operating with a reduced or minimized pressure drop can correspond to a sorption/desorption process where the difference between the maximum and minimum pressure for the process is 500 kPa or less, or 350 kPa or less, or 300 kPa or less, or 250 kPa or less, with all steps in the process having a pressure of at least 100 kPa. In other aspects, operating with a reduced or minimized pressure drop can correspond to a sorption/desorption process where all steps in the process are performed at a pressure of 100 kPa or less. In still other aspects, operating with a reduced or minimized pressure drop can allow for operation of a sorption/desorption cycle where the input flow of oxygen-containing gas is provided at a pressure of at least about 100 kPa and the purge or exhaust flow for desorbing $N_2$ from the adsorbent is exhausted at a pressure of about 1-90 kPa. In any or all of these various aspects, the sorption/desorption process can be performed at a commercially viable rate of oxygen production, such as production of at least 1 MSCF/day (or at least 10 MSCF/day) of enriched-oxygen product per adsorbent bed structure, such as per rotary wheel structure. Optionally, this rate of oxygen production can correspond to the net oxygen produced from an adsorbent bed, and thus can include both the oxygen-enriched product from the nitrogen sorption step as well as a portion of an oxygen-containing product from a co-current blowdown step. As an alternative, in some aspects smaller scale production of oxygen can be performed, such as production of oxygen of 5 liters per minute or less of enriched-oxygen product per adsorbent bed structure.

In various additional or alternative aspects, systems and methods are provided for separating oxygen from air using rotary wheel sorption-desorption. The rotary wheel can include a sorbent that is selective for adsorption of nitrogen relative to oxygen. A compressed air feed can then be contacted with the wheel to form a pressurized stream enriched in oxygen. After adsorbing nitrogen, the rotation of the wheel can carry the adsorbent through successive stages where the adsorbent can be depressurized, regenerated, and repressurized. Optionally, one or more intermediate blow-down steps can be performed between adsorption and desorption of nitrogen. The optional intermediate blowdown step(s) can allow additional enriched oxygen product to be recovered after the end of the adsorption step but prior to substantial desorption of nitrogen from the adsorbent.

Using a rotary adsorbent wheel for production of an enriched oxygen stream can potentially provide various advantages relative to a conventional pressure swing adsorption (PSA) process. For example, a conventional packed bed based PSA process can require significant maintenance of the flow switching valves which limits process reliability and availability. Often a separate oxygen supply, such as compressed oxygen or liquid oxygen, would be needed if the oxygen demand needs to be continuous and cannot be interrupted because of the frequent required maintenance. By contrast, a rotary wheel adsorption system can use fewer or even no valves, which can allow for a higher process reliability and availability. A rotary wheel adsorption system can reduce or minimize the number of valves due in part to the motion of the adsorbent wheel. In a fixed adsorbent bed system, the adsorbent bed remains in a single location while the bed is exposed to different gas flows, temperatures, and/or pressures. Delivering these different environments to the volume containing the adsorbent bed results in the need for a plurality of switching valves. For a rotary wheel adsorbent, the rotation of the adsorbent wheel allows the adsorbent to travel into different adsorption/desorption environments. This can allow the conditions within each type of adsorption/desorption environment to remain relatively steady while the rotation of the adsorbent wheel changes the portion of the adsorbent wheel exposed to each environment.

Because a rotary wheel adsorbent system allows the adsorbent to pass through various sorption and desorption zones, the number of valves can be reduced or minimized. However, a rotary wheel adsorbent system can have adjacent angular zones or sectors with a difference in pressure of at least about 0.1 bar (~10 kPa), or at least about 0.3 bar (~30 kPa), or at least about 0.5 bar (~50 kPa), or at least about 1 bar (~100 kPa), or at least about 1.5 bar (~150 kPa), or at least about 2.0 bar (~200 kPa), such as up to about 5.0 bar (~500 kPa) or more. In order to maintain this pressure differential, radial seals can be used. Because the goal is to provide an enriched oxygen product rather than a high purity oxygen product, a small amount of leakage across a radial seal can be tolerated. An example of a suitable radial seal can be to use a brush seal in combination with providing a polished surface for the adsorbent wheel. This can be in contrast to the types of seals used for some other rotary wheel adsorbent applications, where a rubber "windshield wiper" type seal can be suitable for separating adjacent angular zones with a pressure differential of about 0.2 bar (~200 kPa) or less. Brush type seals can also be suitable for providing a periphery or rim seal for the adsorbent wheel.

Another option for providing a suitable seal can be to allow the rotary wheel to rotate in a series of steps, as opposed to continuously rotating. In this type of configuration, the rotary wheel can rotate for an angular distance and then stop. When the wheel stops, a periphery seal can clamp onto the wheel to reduce, minimize, or eliminate leakage at the edge of the perimeter.

In addition to reducing dependence on switching valves, a rotary adsorbent wheel can also potentially provide improved cycle times. The cycle time of a conventional PSA process can be as long as several minutes and can be limited by the switching time requirements of the valves. Because a rotary wheel does not need flow switching valves, the adsorption-desorption time cycle can be reduced or minimized, allowing for greater unit productivity. A shorter adsorption-desorption cycle can also potentially allow for a smaller unit for a specified product rate. The cycle time for a rotary wheel adsorbent can be based on mass transfer rates rather than the valve switching times of a conventional PSA process. Thus, cycle times for a rotary wheel adsorbent can be improved by using high mass transfer rate materials. Various examples of high mass transfer rate materials are available, such as materials based on monoliths with adsorbent wash coats, monoliths with (thin) walls made of bulk adsorbent materials, and/or (small size) granular adsorbent materials. All these approaches can facilitate mass transfer of nitrogen into the adsorbent by reducing or minimizing the diffusion time of nitrogen in the adsorbent.

Separation Process Description

A separation process can be performed on any convenient oxygen-containing feed. In various aspects, air can be a convenient choice of feed for forming an enriched oxygen product. More generally, the feed can have an oxygen content of about 5 vol % to about 30 vol % or less, or about 5 vol % to about 25 vol %, or about 5 vol % to about 20 vol %, or about 10 vol % to about 30 vol %, or about 10 vol % to about 25 vol %. The feed can have a nitrogen content of about 50 vol % to about 95 vol %, or about 50 vol % to about 85 vol %, or about 50 vol % to about 75 vol %, or about 60 vol % to about 95 vol %, or about 60 vol % to about 85 vol %. The feed can also contain any other types of gases commonly found in air, such as water, carbon oxides, and noble gases. If the adsorbent being used is such that its nitrogen capacity is inhibited by feed components such as water, then a pre adsorption step that removes these feed components may be used.

As a preliminary step prior to separation, an oxygen-containing feed such as air can be compressed to a desired pressure. Operating the separation process at a pressure above ambient can assist with separation efficiency. For the primary separation process where nitrogen is selectively adsorbed, an oxygen-containing feed can be compressed to a pressure greater than ambient, such as a pressure of about 2.0 bar-a (~200 kPa-a) to about 5.0 bar-a (~500 kPa). The desorption and/or regeneration steps can be operated at a lower pressure, such as a pressure of about 1.0 bar-a (~100 kPa) to about 3.0 bar-a (~300 kPa). In some aspects, the pressure difference between the adsorption step (i.e., nitrogen adsorption to produce enriched oxygen) and the desorption step (desorption of nitrogen) for regeneration of the adsorbent can be at least about 50 kPa, or at least about 100 kPa, or at least about 150 kPa. In other aspects, the difference between the pressure for the adsorption step and the pressure can be about 200 kPa or less, or about 150 kPa or less, or about 120 kPa or less, or about 100 kPa or less. In still other aspects, a ratio of the pressure during the desorption step and the pressure during the adsorption step can be In yet other aspects, the pressure for the desorption step can be less than about 80% of the pressure for the adsorption step, or less than about 70%, or less than about 60%, or less than about 50%.

As an alternative to compressing the oxygen-containing feed, the pressure difference between the sorption and desorption steps can be provided by reducing the pressure during desorption to a pressure below ambient. In such aspects, the pressure during desorption can be about 0.01 bar-a (~kPa-a) to about 0.9 bar-a (~90 kPa), or about 0.1 bar-a (~10 kPa) to about 0.9 bar-a (~90 kPa), or about 0.4 bar-a (~40 kPa) to about 0.9 bar-a (~90 kPa), or about 0.01 bar-a (~1 kPa-a) to about 0.8 bar-a (~80 kPa), or about 0.1 bar-a (~10 kPa) to about 0.8 bar-a (~80 kPa), or about 0.4 bar-a (~40 kPa) to about 0.8 bar-a (~80 kPa), or about 0.01 bar-a (~1 kPa) to about 0.5 bar-a (~50 kPa), or about 0.1 bar-a (~10 kPa) to about 0.5 bar-a (~50 kPa), or about 0.01 bar-a (~1 kPa) to about 0.2 bar-a (~20 kPa). In such alternative aspects, the pressure during nitrogen adsorption can be an ambient pressure of about 1.0 bar-a (~100 kPa-a), or a compressed feed can be used having a pressure of about 1.0 bar-a to about 5.0 bar-a, or about 1.0 bar-a to about 1.5 bar-a, or about 1.0 bar-a to about 2.0 bar-a, or the compressed feed can have any of the pressures described above.

In optional aspects where at least one intermediate blowdown step is used between nitrogen adsorption and desorption, the pressure differential can also be used to allow for recovery of additional oxygen enriched product. A blowdown step can be operated at a lower pressure than the adsorption step, such as a pressure of about 1.2 bar-a (~120 kPa) to about 3.2 bar-a (~320 kPa). In some aspects, the pressure difference between the adsorption step and a blowdown step can be at least about 0.5 bar, or at least about 1.0 bar, or at least about 1.5 bar. Additionally or alternately, the pressure for the blowdown step can be less than about 80% of the pressure for the adsorption step, or less than about 70%, or less than about 60%, or less than about 50%. In aspects where more than one blowdown step is used, a pressure differential can be present between the blowdown steps. Optionally, the pressure difference between blowdown steps can be at least about 0.2 bar, or at least about 0.5 bar, or at least about 0.7 bar, or at least about 1.0 bar. As another option, in a rotary wheel configuration, any arbitrary number of different blowdown pressures can be used by creating or defining additional angular zones. In such an option, any convenient pressure differential may be used between various blowdown zones.

In various aspects described herein, a sorption/desorption cycle may be described as leading to formation of two oxygen products. A first oxygen product can correspond to the oxygen product formed during sorption, and can have a higher oxygen concentration or purity. A second oxygen product formed during blowdown can have a lower oxygen concentration or purity. Describing a sorption/desorption cycle as generating two oxygen products is convenient for explaining the process and apparatus, but additional intermediate or blowdown steps can also be used. More generally, a plurality of blowdown and/or other intermediate desorption steps can be used between the nitrogen sorption step (for producing the highest purity oxygen stream) and the purge step (for regenerating the adsorbent). When a plurality of intermediate blowdown steps are used, each successive step can have a lower oxygen concentration than the prior step. Any convenient timing can be used for each of the plurality of blowdown steps, with longer times tending to result in larger quantities of blowdown product. It is noted that generally the blowdown product(s) with the lowest purity can be desirable for use during a purge step to desorb $N_2$. Depending on the number of blowdown steps and/or the length of time for each blowdown step, the final blowdown product may not correspond to a large enough volume of purge gas to perform $N_2$ desorption.

During a sorption/desorption cycle, after optionally compressing a feed to a desired pressure, the feed can be contacted with an adsorbent for adsorption of nitrogen. The adsorbent can allow for selective adsorption of nitrogen, resulting in a product enriched in oxygen.

As the adsorption process continues, the amount of $N_2$ adsorbed by the adsorbent can increase to a level where the ability to perform further adsorption is reduced or minimized. As a result, at some point the adsorption step for the adsorbent can be stopped to allow for regeneration of the adsorbent. The selection of when to stop the initial adsorption step can vary based on a variety of factors, such as the configuration of an adsorbent system and the nature of the adsorbent. For a process with a reduced or minimized pressure differential that is performed using a rotary wheel adsorbent configuration, the end of the adsorption step can correspond to the angular location for the when where the adsorbent transitions from the angular zone corresponding to the adsorption process to the next angular zone.

After the adsorption step, the adsorbent can be exposed to a blowdown step. During the blowdown step, the flow of compressed air (or other oxygen-containing feed gas) is stopped. The pressure of the adsorbent bed is then reduced to a lower value. In some aspects, the lower pressure can correspond to the pressure for the desorption step for removing nitrogen from the adsorbent. Alternatively, the lower pressure can correspond to an intermediate pressure between the adsorption and desorption pressure. Still another option can be to have two or more pressures during the blowdown step, with the final pressure optionally corresponding to the pressure for the nitrogen desorption step. In this type of option, one or more of the pressures during the blowdown step can correspond to an intermediate blowdown pressure.

In configurations where a single blowdown step is used, it can be beneficial to perform the blowdown step so that the blowdown product exits the adsorbent wheel in the same flow direction as the adsorption step. The additional blowdown product generated during a single blowdown step can correspond to an oxygen enriched product, although the oxygen concentration and/or the pressure of the blowdown product may be lower than the product from the initial adsorption step. If multiple blowdown steps are used, one or more of the final blowdown steps may have a sufficiently low oxygen concentration to instead treat the blowdown product as a waste or purge stream, rather than as an oxygen-enriched product stream.

As an example of using multiple blowdown steps, a first blowdown step can be used to reduce the pressure to an intermediate pressure. The blowdown product from the first blowdown step can correspond to an oxygen enriched blowdown product. A second blowdown step can then be used to reduce the pressure to the pressure for a subsequent desorption step. The second blowdown product can correspond to a purge or waste product.

After completing the one or more blowdown steps, the adsorbent can be purged to facilitate removal of nitrogen from the adsorbent bed. A purge stream for use during the purge step can correspond to a stream with an elevated oxygen content, to assist with displacing nitrogen from the adsorbent bed. One example of a suitable purge stream can be a portion of an enriched oxygen blowdown product generated by a blowdown step. Additionally or alternatively, a portion of the enriched oxygen product generated during the adsorption step can be used as a purge stream. Still another option can be to use an oxygen-containing stream that is not related to the products generated by the adsorbent wheel system. The product generated during the purge step can optionally be combined with a purge or waste product generated during one or more final blowdown steps.

After purging the adsorbent bed to restore at least a portion of the adsorbent capacity, the adsorbent can be re-pressurized prior to starting another adsorption step. The oxygen-containing feed used during the adsorption step can be used to pressurize the adsorbent. The re-pressurization step can typically produce little or no output. To the degree than an output flow is generated, the output flow can be handled based on the oxygen content and/or pressure of the output flow.

Due to the nature of the separation process, a substantially pure oxygen product is not produced. The net enriched oxygen product generated using a rotary wheel adsorbent system can have an oxygen content of about 30 vol % to about 80 vol %, or about 50 vol % to about 80 vol %, or about 60 vol % to about 80 vol %, or about 70 vol % to about 80 vol %, or about 30 vol % to about 75 vol %, or about 50 vol % to about 75 vol %, or about 60 vol % to about 75 vol %. Due to the pressure drop across the adsorbent during the adsorption step and/or across any valves involved in the system, the pressure of the enriched oxygen product may be lower than the pressure of the input oxygen-containing feed. The pressure may be further decreased if any of the blowdown product is incorporated into the oxygen enriched product generated during adsorption. As noted above, however, the total pressure differential between the maximum and minimum pressures involved in the process can be limited.

As noted above, a portion of the blowdown product and/or the oxygen enriched product can be used as a purge gas, or alternatively a fresh source of an oxygen-containing gas can be used. In either type of scenario, the use of an oxygen-containing gas for purging nitrogen from the adsorbent represents a net input of an oxygen-containing feed without a recovery of the oxygen in the purge feed. This can lead to some reduction in the overall yield or recovery of oxygen from the process. In various aspects, the oxygen in the oxygen-enriched product generated from a rotary wheel adsorbent system can correspond to at least about 50 vol % (and up to about 95 vol % or more) of the oxygen that is introduced into the system, or at least about 55 vol %, or at least about 60 vol %, or at least about 65 vol %, or at least about 70 vol %, or at least about 75 vol %, or at least about 80 vol %, or at least about 85 vol %, or at least about 90 vol %.

In some optional aspects, the separation process can correspond to a separation process with high oxygen recovery, such as an oxygen yield or recovery of at least about 75 vol %, or at least about 80 vol %, or at least about 85 vol %, or at least about 90 vol %, or at least about 92 vol %, such as up to 95 vol % or more. The stream resulting from a high oxygen recovery process can have oxygen content or purity of 30 vol % to 80 vol %, such as any of the oxygen contents described above.

Some examples of processes that can be suitable for achieving a high oxygen recovery can be similar to the process cycle shown in FIGS. 1-5 (as described in greater detail below), which is a process cycle with a reduced or minimized pressure differential between the maximum and minimum pressure in the separation process. Other suitable processes can involve a vacuum pressure swing adsorption (VPSA) process that is performed at least in part at pressures below 101 kPa-a (1 atm).

An example of a vacuum pressure swing adsorption process can include a process with a five step process cycle. The process steps can correspond to the types of process steps noted above. In the five step process cycle, each step is performed for a similar amount of time. For example, the difference in length of time between any two steps within a cycle can be a difference of about 20% or less of the time length for the longest of the two compared steps, or about 15% or less, or about 10% or less. A first process step 1) can correspond to pressurizing a swing adsorption vessel from the feed end of the vessel using an oxygen-containing feed. The pressure after pressurization can correspond to a pressure of about 100 kPa-a to about 300 kPa-a, or about 100 kPa-a to about 250 kPa-a, or about 150 kPa-a to about 300 kPa-a, or about 150 kPa-a to about 250 kPa-a. After pressurization, 2) a feed can be passed into the swing adsorption vessel at constant pressure for generation of an oxygen-enriched product, with withdrawal of the oxygen-enriched product from a product end of the vessel. Preferably, the flow rate of feed during this nitrogen adsorption/product generation step can be sufficient so that "breakthrough" of nitrogen occurs into the product outflow. In a swing adsorption process, as the feed gas is passed through the vessel during an adsorption step, an adsorption "front" can usually be tracked or visualized in the adsorbent. This adsorption "front" corresponds to the distance in the bed the feed travels before new adsorbent is available to perform substantial adsorption on the feed. Conventionally, the adsorption step of a swing adsorption process is usually stopped before the adsorption "front" reaches the end of the vessel, as continuing the adsorption step would lead to introduction of an excess amount of the adsorbed component into the product. By contrast, since the current cycle is designed to improve net recovery of oxygen rather than to maximize yield, allowing the adsorption "front" to reach the end of the vessel can be desirable, as this ensures that the maximum amount of adsorbent capacity has been used for at least partial adsorption of nitrogen. Next, 3) a co-current depressurization or vent can be performed to a lower intermediate pressure. The lower intermediate pressure can be at least 20 kPa lower than the pressure in step 2). The blowdown product or vent stream generated during co-current depressurization can be withdrawn from the product end of the vessel. The intermediate pressure can be a pressure that is lower than the initial pressure and that is between about 50 kPa-a to about 150 kPa-a, or about 50 kPa-a to about 120 kPa-a, or about 50 kPa-a to about 100 kPa-a, or about 50 kPa-a to about 80 kPa-a, or about 70 kPa-a to about 150 kPa-a, or about 70 kPa-a to about 120 kPa-a, or about 70 kPa-a to about 100 kPa-a, or about 90 kPa-a to about 150 kPa-a, or about 90 kPa-a to about 120 kPa-a. Next, 4) a counter-current depressurization can be performed to generate an additional vent product or waste blowdown product. The counter-current depressurization can reduce the pressure to a final pressure below 100 kPa-a, such as a pressure of about 1 kPa-a to about 90 kPa-a, or about 10 kPa-a to about 90 kPa-a, or about 30 kPa-a to about 90 kPa-a, or about 50 kPa-a to about 90 kPa-a, or about 1 kPa-a to about 70 kPa-a, or about 10 kPa-a to about 70 kPa-a, or about 30 kPa-a to about 70 kPa-a, or about 50 kPa-a to about 70 kPa-a, or about 1 kPa-a to about 50 kPa-a, or about 10 kPa-a to about 50 kPa-a, or about 50 kPa-a to about 90 kPa-a, or about 1 kPa-a to about 30 kPa-a, or about 10 kPa-a to about 30 kPa-a, or about 1 kPa-a to about 20 kPa-a. The final pressure can be at least about 20 kPa lower than the intermediate pressure. The waste blowdown or vent product from the counter-current depressurization can be withdrawn from the feed end of the vessel. Finally, 5) at least a portion of the blowdown stream, the product stream, and/or another oxygen-containing stream with a higher purity than the feed stream can be used to purge the vessel at the pressure below 100 kPa-a. The effluent generated during the purge can be withdrawn from the feed end of the vessel. In some optional aspects, the maximum pressure (step 1) and the minimum pressure (step 4) can both be selected to be within the range of about 40 kPa-a to about 200 kPa-a. This can facilitate performing the process with some types of conventional blowers that are suitable for use in a refinery or chemical production setting.

The above five step process can potentially provide a variety of advantages. For example, the blowdown or vent product in step 3) of the above cycle can be recovered as part of the oxygen-enriched product. This is instead of using the blowdown product of step 3) for pressure equalization and/or as an input stream for one or more intermediate purge steps, as it would be used in a conventional process. It is noted that in aspects where oxygen recovery is at least about 90% of the oxygen in the feed, or at least about 95%, the savings in compression energy of using oxygen from the intermediate blowdown step to pressurize another bed can be relatively small, which reduces or minimizes the benefits of using the blowdown product for repressurization. Another potential advantage can be related to performing adsorption during step 2) at a flow rate that is sufficient to allow breakthrough of nitrogen into the product, even though the total length of the adsorption step is similar to the other steps. Still another advantage can be the similar lengths of the steps in the cycle. It is noted that the co-current blowdown step 3) and the depressurization step 4) are inherently rapid. As a result, if steps 3) and 4) are performed for a period of time based on the time needed for reducing the pressure, and if the other steps are within 20% of the time length of steps 3) and/or 4), the overall cycle can be rapid. This can improve the use of the adsorbent as well as improving throughput. Yet another advantage can be the elimination of intermediate blowdown or pressure equalization steps. Because the increases or drops in pressure between steps are relatively small, steps involving intermediate pressures different from the pressures during desired product generation, product blowdown, and desorption can be avoided. The avoidance of these steps can provide a further benefit in reducing or minimizing the need for pressure equalization steps in configurations where multiple swing adsorption vessels are used for simultaneous production of oxygen-enriched product.

In some optional aspects, at least two solid monolithic sorbents can be used in conjunction to allow, during at least some sorption and/or desorption steps, an output from a first wheel to be used as (at least a portion of) an input for a second wheel. For example, at least two solid monolithic sorbents can be oriented such that their cross-sectional planes are approximately parallel and such that they rotate about a common rotational axis, e.g., that is substantially perpendicular to the cross-sectional planes of the monolithic sorbents. In such aspects, each successive solid monolithic sorbent can have a counter-rotational direction that alternates between clockwise and counterclockwise, as viewed along the common rotational axis. In this type of configuration, rather than capturing the output flow from an intermediate step and then "turning around" the intermediate flow for use in a subsequent purge, the intermediate output flow from a first wheel can be used as the purge flow for a second wheel.

Adsorbent Structures: Rotary Wheel Design and Barriers

In some aspects, the processes described herein can be performed using stationary adsorbent beds. In such aspects, the flows into and out of the stationary adsorbent beds can be controlled using valves.

In other aspects, a rotary wheel adsorbent system can be used to perform a continuous or semi-continuous, cyclic, sorption-desorption method for enhanced control, separation, and/or purification of $O_2$ from one or more sources of a mixture of gases through integrated use of solid monolithic sorbents having a selectivity for sorption of $N_2$. Though described herein as "monolithic", the solid sorbents according to the invention can be aggregated particulate, monolithic, and/or structured, so long as they behave as if solid and cohesive from the point of view of the contact with the gaseous/fluid streams described herein. Solid monolithic sorbents (particularly when employed in a rotating wheel-type configuration) can have distinct advantages over conventional sorbents, including, but not necessarily limited to, the ability to process relatively large gas volumes/flow rates, continuous operation, and few/no valves (thus little or no flow switching required).

As an example of an adsorbent structure, the diameter of an adsorbent wheel for a rotary wheel adsorbent system can be about 2 meters to about 20 meters (or more). The width can be about 0.1 meters to about 0.7 meters or more. The gas velocity entering a rotary wheel adsorbent system can be from about 0.05 m/s to about 5 m/s or more. The pressure drop across the adsorbent wheel can be about 0.5 bar (~50 kPa) or less, or about 0.4 bar (~40 kPa) or less, or about 0.3 bar (~30 kPa) or less, or about 0.2 bar (~20 kPa) or less, or about 0.1 bar (~10 kPa) or less.

In order for solid adsorbent to be generally effective for $O_2$ capture, at least one, and preferably most or all, of the following can advantageously apply: the sorbent material can have a relatively high sorption capacity for $N_2$, so as to reduce/minimize the required adsorbent volume and/or process footprint; the sorbent material can have relatively fast $N_2$ sorption and desorption kinetics, e.g., so that relatively short sorption-desorption cycle times (e.g., about 15 seconds to about 10 minutes) can be utilized, allowing increased/optimized productivity for a given size plant; the sorbent material can have a relatively high tolerance to water, e.g., so that moisture in the air (or other oxygen-containing feed) does not significantly reduce $N_2$ sorption; the sorbent material can have an acceptable tolerance to contaminants (such as $CH_4$ or $NO_x$), with no significant reduction in $N_2$ capacity, e.g., due to irreversible binding or chemical reaction of such contaminants with the sorption sites; the sorbent material can have relative stability to temperature cycling and steam; and the sorbent material can have relatively high $N_2/O_2$ sorption selectivity.

Examples of suitable adsorbent materials for separation of $N_2$ from $O_2$ can include alkali-exchanged zeolite X adsorbents and/or highly cationic zeolites. Lithium-exchanged zeolite X (LiX) can have a higher charge density than other alkali-exchanged zeolite X adsorbents, and therefore can be preferred. Other suitable examples can include adsorbents based on zeolite 5A, NaX, CaX, and LiLSX. Still other suitable zeolite adsorbents can include, but are not limited to, other FAU framework type zeolites such as zeolite Y, and zeolite Beta. Such other zeolite adsorbents can also be alkali-exchanged. The degree of alkali-exchange for a zeolite adsorbent can be any convenient amount, with greater amounts of alkali-exchange potentially leading to greater selectivity for $N_2$ and/or adsorption capacity for $N_2$.

Although the sorbent materials are referred to herein as solid and monolithic, they need only act or behave as solid and monolithic with respect to the flow of the mixed gas source(s). For instance, they can alternately comprise (optionally packed) granular particulate sorbent materials and/or inert (structured) packing onto which sorbent (e.g., zeolite adsorbent or the like) can be immobilized/grafted.

In some aspects, it can be convenient to incorporate the adsorbent materials into an adsorbent wheel in the form of a coating and/or particles that are supported on an underlying structure. The adsorbent coating and/or particles can be deposited on a wheel structure by any convenient method, such as by forming a washcoat on a wheel structure. The wheel structure supporting the adsorbent materials can be made of any convenient structural material that can withstand the stresses resulting from rotation of the wheel.

Wash-coats can be used to introduce functionality to a solid monolithic sorbent and/or to augment already existing functionality. When a wash-coat is utilized, its thickness can be tailored (optimized) to allow rapid $N_2$-adsorbent mass exchange and to advantageously facilitate a large capacity for adsorbed $N_2$. In general, a thicker wash-coat can increase sorbent capacity, but diffusion resistance can often limit the rate at which the $N_2$ can be adsorbed/desorbed. Alternately, a relatively thin wash-coat can allow relatively rapid $N_2$ exchange but with attendant lower sorbent capacity increase, if any is appreciable.

The monolith can include a plurality of channels for passing a flow of feed gas through the monolith for adsorption of $N_2$. Narrow monolith flow channels can allow a larger $N_2$-sorbent contact area and can be desirable, in some embodiments, from mass transfer considerations. However, narrower flow channels can undesirably increase pressure drop. The size of the channels can be tailored/optimized to achieve acceptable contact area within the constraint of permissible pressure drop. The channels can be circular or of any other shape (such as rectangular, hexagonal, or the like, or modifications thereof, e.g., to include protrusions into the channel for additional contact area) consistent with the requirements of acceptably high mass transfer area and acceptably low pressure drop.

Adsorption can tend to lead to the generation of heat. Rising temperature in the solid monolithic sorbent(s) can tend to reduce sorption capacity. The integration of additional cooling mechanisms to combat adiabatic temperature increases can be effected, e.g., by injection of atomized liquid droplets or sprays or running liquid streams through the sorbent bed or monolith channels.

When the term "selectivity" is used herein with respect to the propensity of a sorbent to favor sorption of a first component, typically $N_2$, over a desired product component, such as $O_2$. It should be understood that such "selectivity" is based on approximately an equilibrium sorption process with the sorbent, and not on a kinetic sorption process. That means that selectivities described herein represent competitive sorption between components on a time scale that is long enough to approximate equilibrium—whether such a sufficiently long time scale may be on the order of portions of seconds or multiple hours (or anywhere in between) should not be particularly relevant.

The source(s) of oxygen-containing gas used as a feed for forming an oxygen enriched product can advantageously comprise from about 10 vol % to about 30 vol % $O_2$, e.g., from about 10 vol % to about 30 vol $O_2$, from about 10 vol % to about 25 vol % $O_2$, from about 10 vol % to about 20 vol % $O_2$, from about 15 vol % to about 30 vol % $O_2$, from about 15 vol % to about 25 vol % $O_2$, from about 20 vol % to about 30 vol % $O_2$, or from about 20 vol % to about 25 vol % $O_2$. Additionally or alternately, the source(s) of oxygen-containing gas can advantageously comprise from about 10 vol % to about 90 vol % $N_2$, e.g., from about 10 vol % to about 90 vol % $N_2$, from about 10 vol % to about 80 vol % $N_2$, from about 10 vol % to about 70 vol % $N_2$, from about 10 vol % to about 60 vol % $N_2$, from about 10 vol % to about 50 vol % $N_2$, from about 20 vol % to about 90 vol % $N_2$, from about 20 vol % to about 80 vol % $N_2$, from about 20 vol % to about 70 vol % $N_2$, from about 20 vol % to about 60 vol % $N_2$, from about 20 vol % to about 50 vol % $N_2$, from about 30 vol % to about 90 vol % $N_2$, from about 30 vol % to about 80 vol % $N_2$, from about 30 vol % to about 70 vol % $N_2$, from about 30 vol % to about 60 vol % $N_2$, from about 40 vol % to about 90 vol % $N_2$, from about 40 vol % to about 80 vol % $N_2$, from about 40 vol % to about 70 vol % $N_2$, from about 40 vol % to about 60 vol % $N_2$, from about 50 vol % to about 90 vol % $N_2$, from about 50 vol % to about 80 vol % $N_2$, from about 50 vol % to about 70 vol % $N_2$, from about 60 vol % to about 90 vol % $N_2$, or from about 60 vol % to about 80 vol % $N_2$.

In some aspects, during the $N_2$ sorption step, the solid monolithic sorbent can optionally but advantageously have a $N_2/O_2$ selectivity at the operating conditions in the sorption step of at least 2, e.g., at least 3, at least 4, at least 5, at least 7, at least 10, at least 15, at least 20, at least 25, at least 30, at least 50, at least 75, at least 100, at least 200, at least 300, at least 400, at least 500, at least 750, or at least 1000. Additionally or alternately, the solid monolithic sorbents can optionally but advantageously have a $N_2/O_2$ selectivity at the operating conditions in the sorption steps of up to 10000, e.g., up to 7500, up to 5000, up to 3000, up to 2500, up to 2000, up to 1500, up to 1000, up to 750, up to 500, up to 300, up to 250, up to 200, up to 150, up to 100, up to 75, up to 50, up to 30, up to 25, up to 20, up to 15, or up to 10.

In some aspects, a complete revolution of the rotary adsorbent wheel can be viewed as a full traversal of a cyclic sorption-desorption process. The cycle time for the cyclic sorption-desorption process (i.e., one full revolution of the rotary adsorbent wheel) can have an average total cycle time from about 10 seconds to about 30 minutes, e.g., from about 10 seconds to about 30 minutes, from about 10 seconds to about 20 minutes, from about 10 seconds to about 10 minutes, from about 10 seconds to about 5 minutes, from about 10 seconds to about 2 minutes, from about 10 seconds to about 1 minute, from about 30 seconds to about 30 minutes, from about 30 seconds to about 20 minutes, from about 30 seconds to about 10 minutes, from about 30 seconds to about 5 minutes, from about 30 seconds to about 2 minutes, from about 30 seconds to about 1 minute, from about 1 minute to about 30 minutes, from about 1 minute to about 20 minutes, from about 1 minute to about 10 minutes, from about 1 minute to about 5 minutes, from about 1 minute to about 2 minutes, from about 2 minutes to about 30 minutes, from about 2 minutes to about 20 minutes, from about 2 minutes to about 10 minutes, or from about 2 minutes to about 5 minutes.

In various aspects, the conditions for $N_2$ desorption can include a pressure swing/reduction, a temperature swing/increase, or both. As such, the cyclic sorption-desorption methods described herein can involve PSA, rapid cycle PSA (RCPSA), TSA, rapid cycle TSA (RCTSA), a combination of pressure and temperature swings (PTSA), a partial pressure swing (PPSA), or the like, or some combination or integration thereof. For example, the counter-current purge feed (oxygen rich product used to desorb nitrogen (FIG. 4)) may be heated to facilitate desorption of nitrogen. Likewise, this counter-current purge may use steam, either by itself or in combination with the oxygen product. In embodiments where rapid cycles are desired/utilized, the average total cycle time can be no more than about 1 minute, e.g., no more than about 45 seconds, no more than about 30 seconds, no more than about 20 seconds, no more than about 15 seconds, no more than about 10 seconds, or no more than about 5 seconds (and, though no lower limit is specified, it can be impractical in some embodiments for solid monolithic sorbents to undergo an average total cycle time less than about 1 second).

In certain aspects, the temperature conditions for all the input streams, output streams, and solid monolithic sorbents during the sorption and/or desorption process steps can collectively range from about −40° C. to about 100° C., e.g., from about −40° C. to about 100° C., from about −20° C. to about 100° C., from about 0° C. to about 100° C., from about 10° C. to about 100° C., from about 15° C. to about 100° C., from about 20° C. to about 100° C., from about 25° C. to about 100° C., from about 30° C. to about 100° C., from about 40° C. to about 100° C., from about −40° C. to about 80° C., from about −20° C. to about 80° C., from about 0° C. to about 80° C., from about 10° C. to about 80° C., from about 15° C. to about 80° C., from about 20° C. to about 80° C., from about 25° C. to about 80° C., from about 30° C. to about 80° C., from about 40° C. to about 80° C., from about −40° C. to about 60° C., from about −20° C. to about 60° C., from about 0° C. to about 60° C., from about 10° C. to about 60° C., from about 15° C. to about 60° C., from about 20° C. to about 60° C., from about 25° C. to about 60° C., from about 30° C. to about 60° C., from about 40° C. to about 60° C., from about −40° C. to about 40° C., from about −20° C. to about 40° C., from about 0° C. to about 40° C., from about 10° C. to about 40° C., from about 15° C. to about 40° C., from about 20° C. to about 40° C., from about 25° C. to about 40° C., from about 30° C. to about 40° C., or from about −40° C. to about 30° C., from about −20° C. to about 30° C., from about 0° C. to about 30° C., from about 10° C. to about 30° C., from about 15° C. to about 30° C., from about 20° C. to about 30° C.

Example: Rotary Wheel Separator Operation

In order to simplify the description herein, an example of a separation process for forming enriched oxygen is provided independent of the type of separation apparatus. The process is described here as a plurality of adsorption and/or desorption steps. In a rotary wheel adsorbent apparatus, different portions of the adsorbent wheel can be exposed to each of the various steps at any given time. For ease of description, the process can be understood by following a portion of the adsorbent wheel as the portion traverses through the angular zones corresponding to each step.

FIGS. 1-5 schematically show an example of a process for forming an enriched oxygen stream from air according to a process as described herein. The process steps shown in FIGS. 1-5 are general, and could be performed using a variety of types of equipment suitable for performing a pressure swing adsorption process. Although FIGS. 1-5 show "valves" to indicate the ability to start or stop various process input and output flows, the "valves" are not required in an implementation corresponding to a rotary wheel adsorbent system. FIG. 6 schematically shows how the process in FIGS. 1-5 can be implemented using a rotary wheel adsorbent system.

FIG. 1 shows the sorption step of a sorption/desorption cycle. In the system shown in FIG. 1, an air feed 105 has been compressed to a pressure of 3 bars (~300 kPa). Valve 107 is opened to allow air feed 105 to pass into and through adsorbent bed 110. Valve 147 is also opened to allow enriched oxygen product 145 to be collected. In the process example illustrated in FIG. 1, the enriched oxygen product 145 is at a pressure of 2.75 bars (~275 kPa). In FIG. 1, valves 127, 137, and 157 are closed, so that purge feed 125, high pressure vent product 135, and low pressure vent product 155 are not in fluid communication with adsorbent bed 110. Any convenient adsorbent for adsorbing nitrogen from the compressed air feed 105 can be used in adsorbent bed 110, such as an LiX adsorbent.

Figure 2:
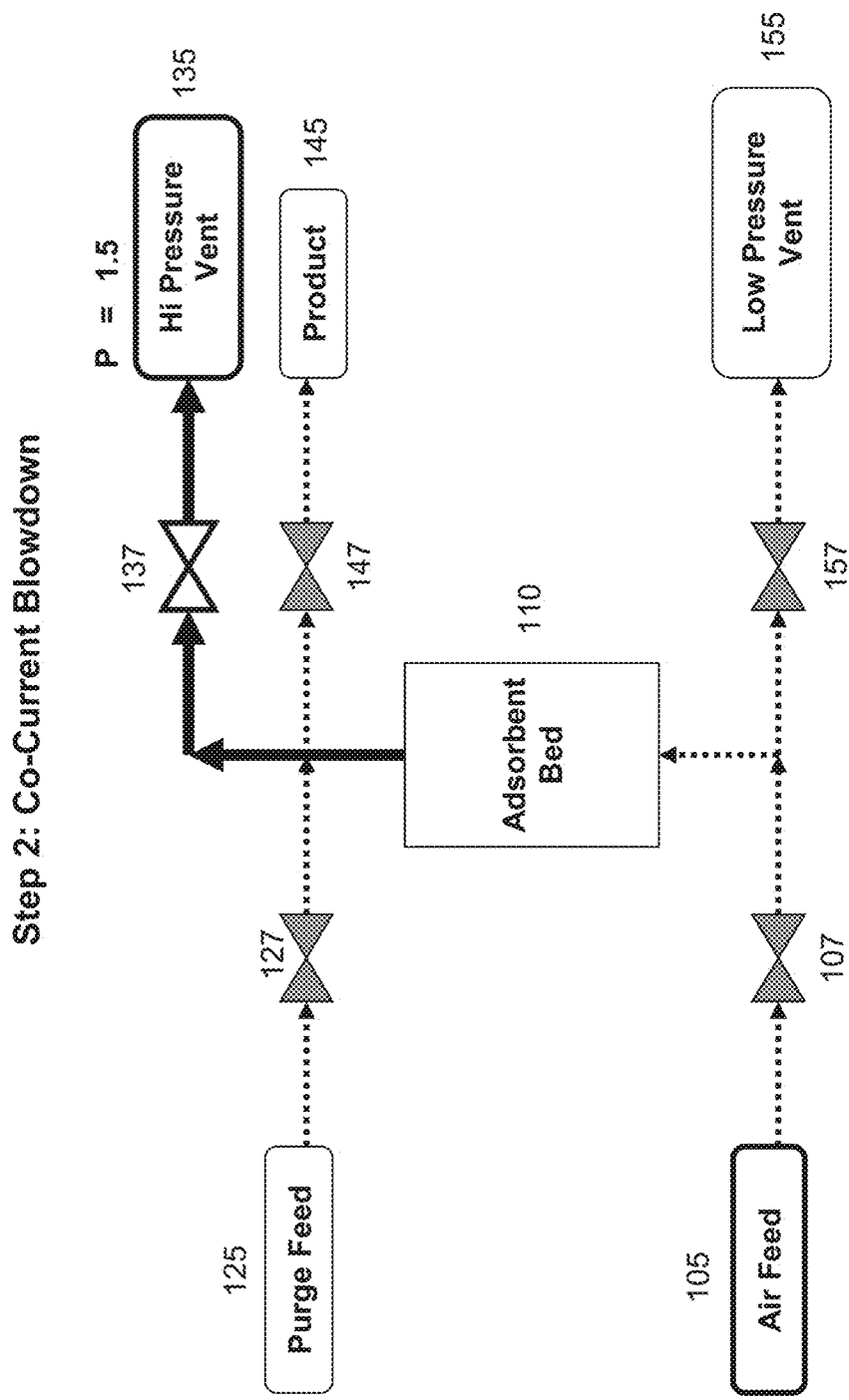
FIG. 2 schematically shows an example of a process step from a sorption/desorption cycle.

FIG. 2 shows a first blowdown step of a sorption/desorption cycle. In FIG. 2, valve 107 is closed so that no additional compressed air feed 105 is introduced into adsorbent bed 110. Valve 147 is also closed. Valve 137 is opened to allow the existing pressure in adsorbent bed 110 to be reduced to an intermediate level, such as the 1.5 bars (~150 kPa) shown in FIG. 2. In FIG. 2, the first stage blowdown product is shown as a "high pressure vent" product 135. This product can still have a sufficiently high oxygen content to be suitable for use as an enriched oxygen product. This could be compressed and combined with the enriched air product 145, used as a separate product, and/or used as a portion of purge feed 125.

Figure 3:
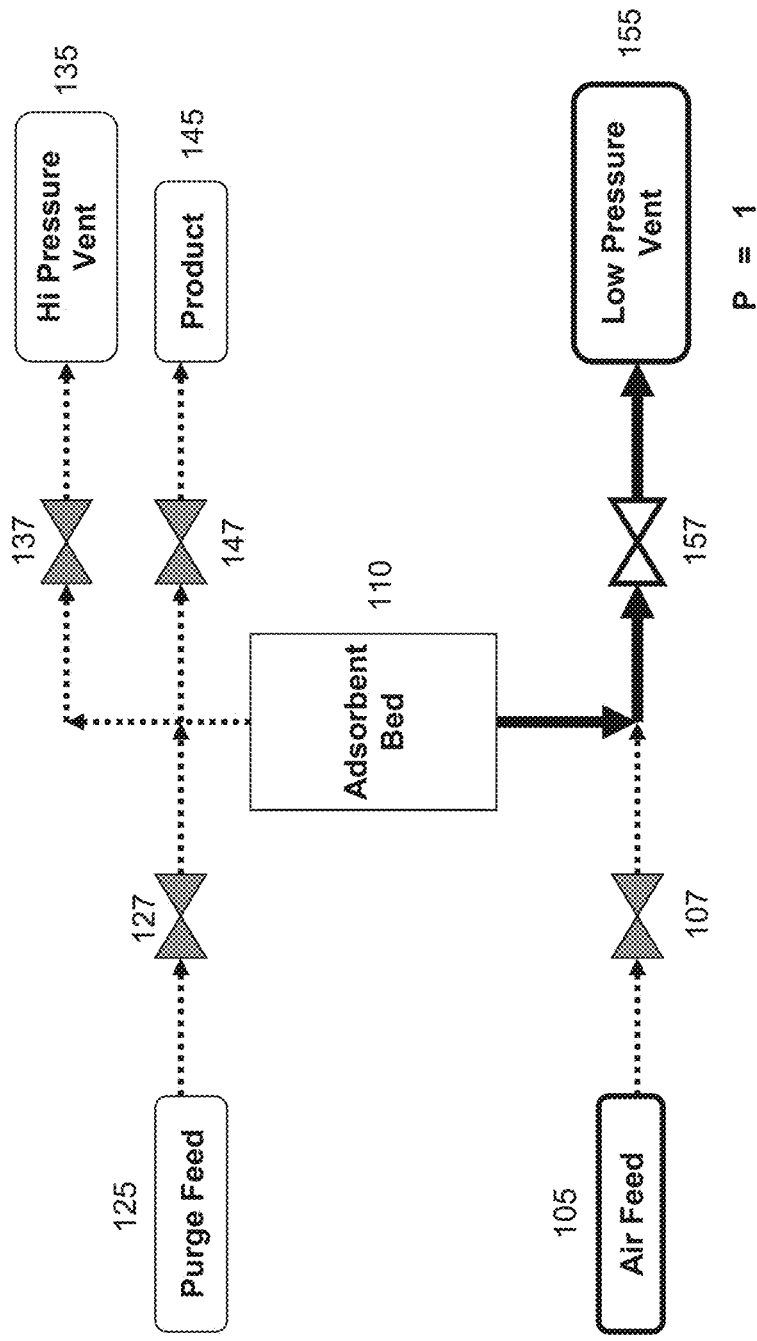
FIG. 3 schematically shows an example of a process step from a sorption/desorption cycle.

FIG. 3 shows a second blowdown step of a sorption/desorption cycle. In FIG. 3, valve 137 is closed while valve 157 is opened. As the pressure is reduced, a portion of the adsorbed nitrogen in adsorbent bed 110 can start to be released. This can reduce the oxygen concentration of the gas mixture within the adsorbent bed. When the pressure is low enough, the oxygen enrichment in the blowdown product may be low enough that a remaining portion of the blowdown product can be a waste stream. This is schematically represented by the separate blowdown products shown in FIGS. 2 and 3. In the example shown in FIGS. 1-5, a portion of the product from the blowdown step can be captured as a high pressure vent product 135, as shown in FIG. 2. The remaining portion of the blowdown product can then correspond to low pressure vent product 155 as shown in FIG. 3. In FIG. 3, the low pressure vent product 155 is shown as having a pressure of 1 bar (~100 kPa), but if desired the system can be run with a minimum pressure either greater than or lower than ambient pressure. It is noted that the blowdown shown in FIG. 3 is shown as a counter-current blowdown step, as opposed to the co-current sorption in FIG. 1 and co-current blowdown shown in FIG. 2. For steps related to regeneration of the adsorbent, performing the steps in a counter-current manner can be beneficial when the sorption step is stopped prior to "breakthrough" of the component that is being preferentially adsorbed. For example, during a sorption step, the parts of the adsorbent closest to the entrance of the gas flow can adsorb a greater portion of the component being adsorbed. As the portion of the adsorbent near the entrance becomes saturated, portions of the adsorbent that are farther downstream can become loaded. If the sorption step is stopped before the entire adsorbent becomes saturated, an adsorption profile can exist across the adsorbent, with a lower amount of adsorbed gas component near the exit of the vessel. When attempting to regenerate the adsorbent, if a co-current purge flow is used, the initial part of the purge cycle could simply result in pushing the shape of the adsorption profile toward the exit. By instead using counter-current flows during desorption, the adsorbent profile is pushed toward the counter-current exit, which can avoid the issue of having internal re-adsorption of gas during a purge.

Figure 4:
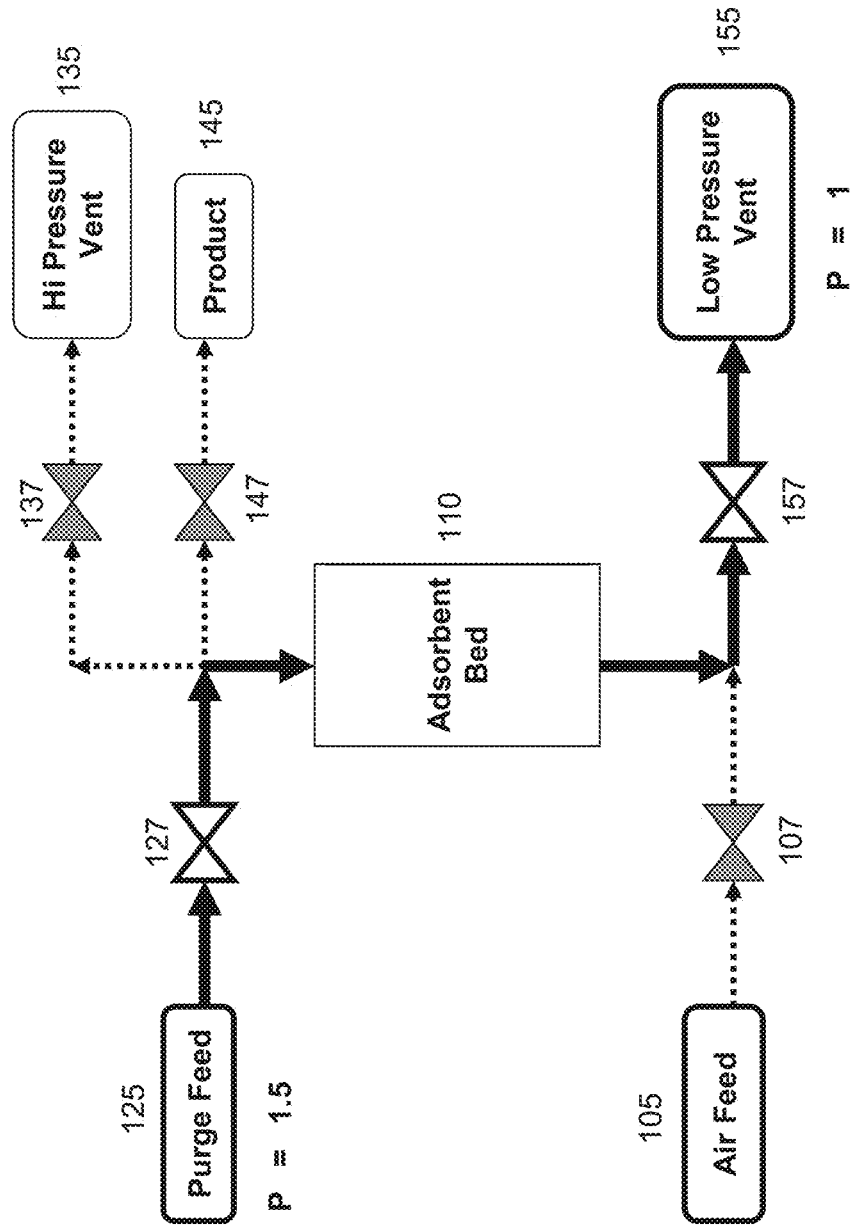
FIG. 4 schematically shows an example of a process step from a sorption/desorption cycle.

FIG. 4 shows a nitrogen desorption step of a sorption/desorption cycle. In FIG. 4, valve 157 remains open. Valve 127 is also opened so that a purge feed 125 is introduced into adsorbent bed 110. The purge feed 125 can be a feed with a higher oxygen concentration than the compressed air feed 105. This can assist with desorbing nitrogen from adsorbent bed 110. The purge feed 125 in FIG. 4 is shown as being introduced at a pressure of 1.5 bar (~150 kPa). This can be a convenient pressure for the purge feed 125, for example, so that at least a portion of the high pressure vent product 135 (i.e., first blowdown product) can be used as the purge feed 125.

Figure 5:
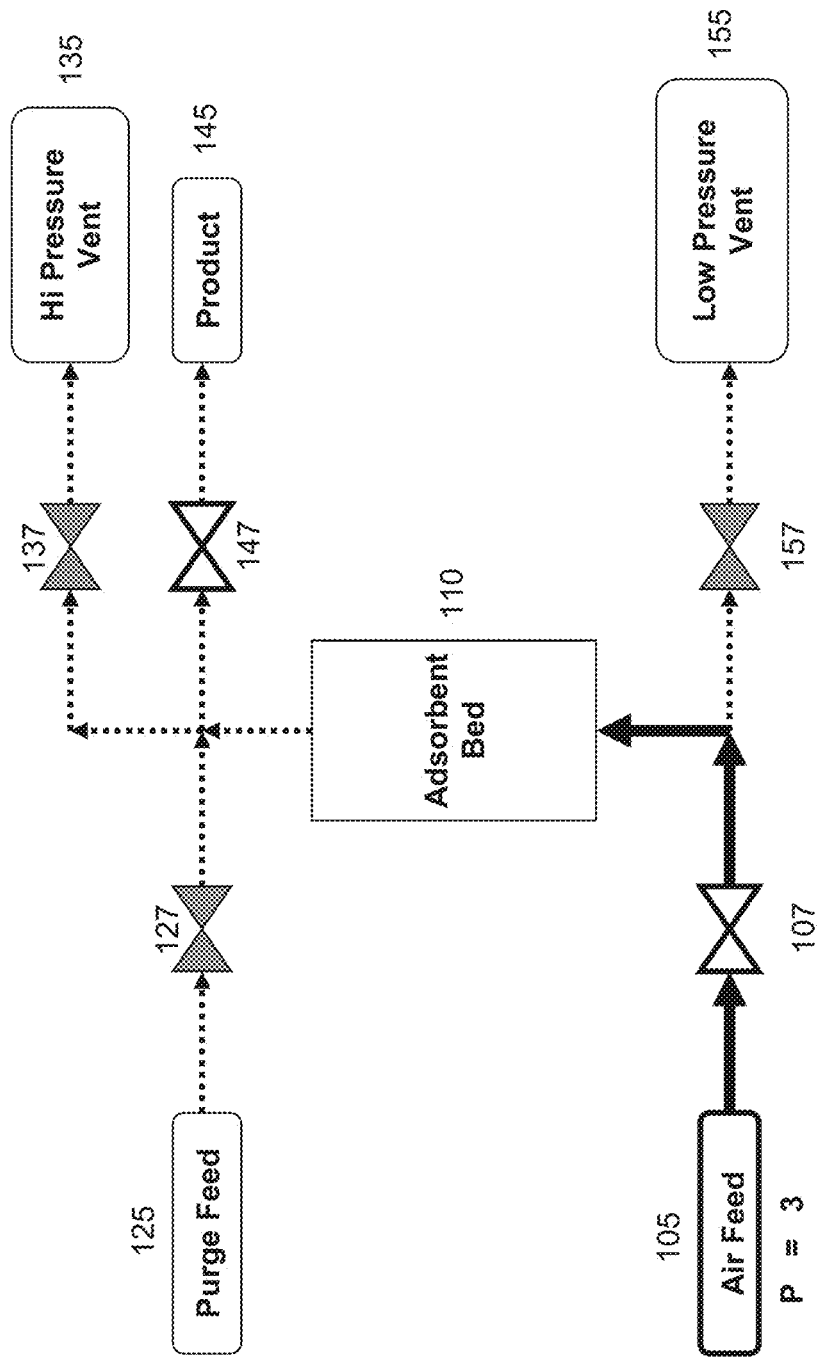
FIG. 5 schematically shows an example of a process step from a sorption/desorption cycle.
Figure 6:
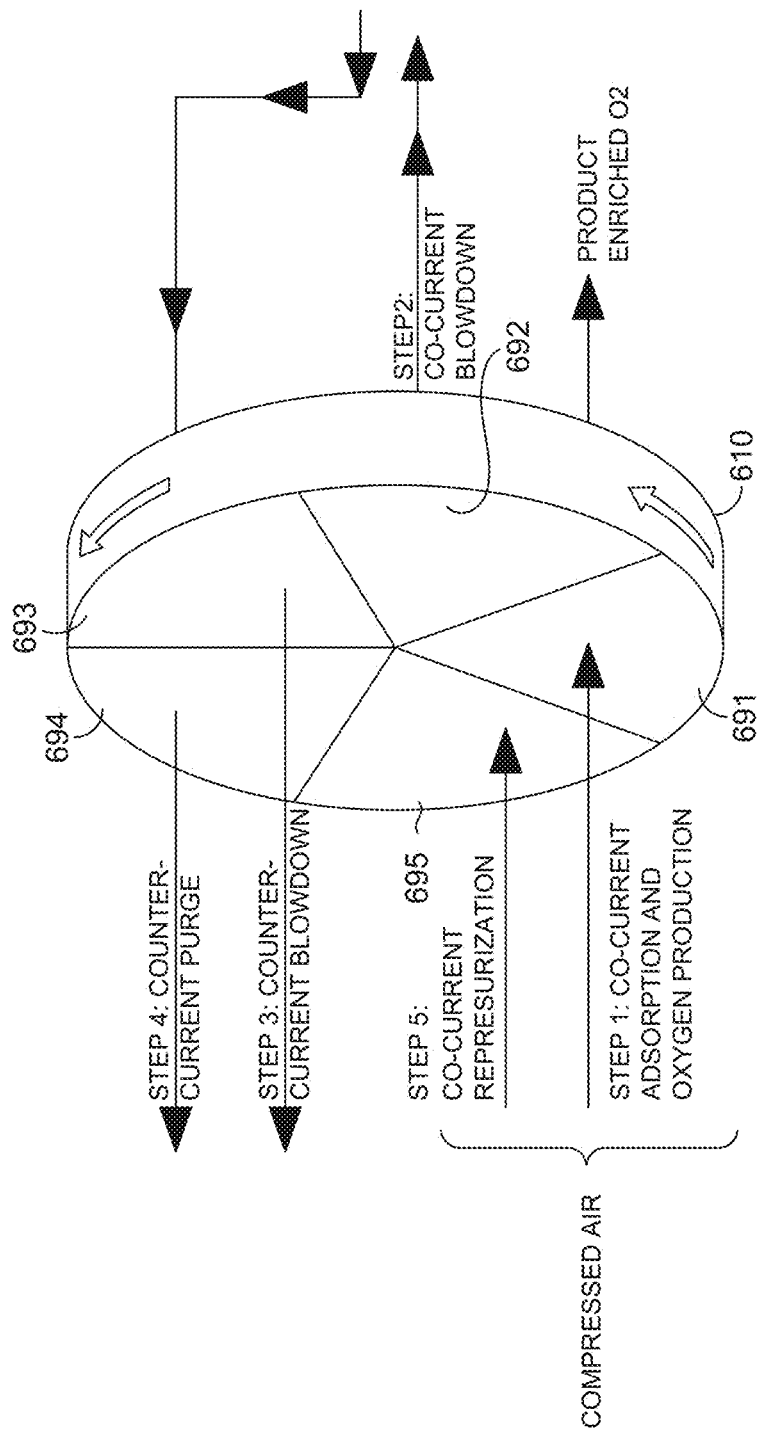
FIG. 6 schematically shows an example of performing the process steps shown in FIG. 1-5 using a rotary wheel adsorbent system.

FIG. 5 shows a repressurization step of a sorption/desorption cycle. In FIG. 5, valves 127 and 157 are closed. Valve 107 is opened to allow compressed air feed 105 to be introduced into adsorbent bed 110. This can return the pressure to the desired adsorption pressure, such as 3 bar (~300 kPa), prior to starting collection of enriched oxygen product 145.

FIG. 6 shows an example of how the process flows shown in FIGS. 1-5 can be processed in a rotary wheel adsorbent system. In FIG. 6, a rotary wheel adsorbent 610 is shown as having five different angular zones 691, 692, 693, 694, and 695. In the embodiment shown in FIG. 6, the fives angular zones 691-695 represent the different process steps. For example, angular zone 691 can correspond to the process step shown in FIG. 1, angular zone 692 can correspond to the process step shown in FIG. 2, angular zone 693 can correspond to the process step shown in FIG. 3, angular zone 694 can correspond to the process step shown in FIG. 4, and angular zone 695 can correspond to the process step shown in FIG. 5. Of course, in other aspects, any convenient number of angular zones can be used to allow for any convenient number of sorption, blowdown, desorption, and/or repressurization steps. The size of the angular zones in FIG. 6 is illustrative only. The size of the angular zones can be individually selected for each process step so that a given position on the adsorbent wheel spends a desired amount of time exposed to each process step. Thus, the size of the sorption and oxygen production angular zone 691 can be larger than the size of the repressurization angular zone 695.

An example of a process that can be implemented using a rotary adsorbent wheel similar to the wheel shown in FIG. 6 can start with a compressed air feed at 3.0 bars (~300 kPa) with an oxygen content of about 20 vol %-21 vol % that is fed into angular zone 691. An enriched oxygen product generated from angular zone 691 can have an oxygen content of about 71 vol %. The pressure of the product from angular zone 692 can be about 2.75 bars (~275 kPa). Additional oxygen product can also (optionally) be recovered from co-current blowdown in angular zone 692, although at a lower pressure of about 1.5 bars. Angular zone 693 can provide a counter-current blowdown to reduce the pressure of the adsorbent to about 1.0 bar (~100 kPa). Angular zone 694 can correspond to a counter-current purge of the adsorbent at a pressure of 1.0 bar (~100 kPa). Optionally, the purge gas for performing the counter-current purge can be at least partially provided by the co-current blowdown product from angular zone 692, as shown in FIG. 6. Finally, the adsorbent can be repressurized to about 3.0 bars (~300 kPa) using compressed air in angular zone 695. The oxygen in the enriched oxygen product can correspond to about 65% of the oxygen introduced into the rotary adsorbent wheel system. This recovery value represents the net amount of oxygen recovered from product recovery in angular zone 691 and co-current blowdown in angular zone 692 (but excluding any oxygen from angular zone 691 or co-current blowdown zone 692 that is re-introduced into the wheel for use at another angular zone, such as use for the counter-current purge in angular zone 694).

Example: Vacuum Pressure Swing Adsorption

Model calculations were performed using a detailed dynamic model to demonstrate the differences between the five step VPSA cycle described above and a conventional VPSA cycle. The adsorption bed modeled in the dynamic model was a packed bed of spherical LiLSX adsorbent particles. The adsoprtion kinetics were modeled using a linear driving force and the adsorption isotherm was modeled using the Langmuir equation. Temperature variations were dampened using added thermal mass. Transient material and heat balances, pressure drops, valve and tank operations were considered and solved using the gPROMS software package. Oxygen product purity and recovery were calculated after the system reached cyclic steady state.

In a first set of simulations, model calculations were performed using the five step VPSA cycle with various combinations of maximum (feed) and minimum (purge) pressure for the cycle. The feed pressures were set to about 100 kPa-a, 120 kPa-a, and 200 kPa-a, with corresponding purge pressures of 20 kPa-a, 50 kPa-a, and 50 kPa-a. The intermediate blowdown product pressures were either 100 kPa-a or 70 kPa-a. The simulations were run under conditions suitable for production of about 2700 tons/day (66.6 MSCFD) of oxygen when using a typical air composition as the feed.

Table 1 shows a summary of results from simulations using the five step VPSA cycle described above at various combinations of maximum and minimum pressure for the cycle. It is noted that each of the cycles operates within a range of pressure from 40 kPa-a to 200 kPa-a. Cycle 1 has a ratio of maximum to minimum pressure of 6 (or alternatively a ratio of minimum to maximum of 0.16), while cycle 2 has a ratio of 2 and cycle 3 has a ratio of 4. Cycle 2 in Table 1 is referred to as having a "high" ratio of purge pressure to feed pressure (a ratio of purge to feed pressure of at least 0.4), while cycles 1 and 3 are considered "low" ratios of purge pressure to feed pressure. As shown in Table 1, a "high" ratio of purge pressure to feed pressure can be beneficial for generating a stream with improved oxygen purity (such as an oxygen purity of at least 70 vol %, or at least 80%), but the overall oxygen recovery can be below 85%, or below 80%. By contrast, a "low" ratio of purge pressure to feed pressure can reduce the purity of the oxygen-enriched product stream, but can also lead to increased oxygen recovery values of at least about 85%, or at least about 90%, or at least about 95% relative to the oxygen in the feed.

TABLE 1

Comparison of high recovery VPSA cycle conditions

| Cycle | P_high, bar | P_low, bar | P_int, bar | Purge/Feed ratio | Purity, % | Recovery, % |
|---|---|---|---|---|---|---|
| 1 | 1.2 | .2 | 1 | low | 40 | 95 |
| 2 | 1 | .5 | .7 | high | 80 | 76 |
| 3 | 2 | .5 | 1 | low | 40 | 85 |

Table 2 shows results from simulations of a) an oxygen separation process operated according to conventional VPSA conditions in order to produce a product with 95 vol % oxygen purity; b) an oxygen separation process operated according to conventional PSA conditions, where the product is subsequently blended with additional air to produce an oxygen-enriched product having a purity of 40 vol % oxygen; and c) an oxygen separation process operated using the five step VPSA process and the conditions specified in cycle 3 of Table 1. With regard to energy consumption for compression and vacuum generation, compression/vacuum energy requirements for the separation were estimated using an ideal gas compression:

$$E = (F_{inlet} RT \ln(N_{high}/P_{atm}) + F_{exhaust} RT \ln(P_{atm}/P_{low}))/F_{outlet}$$

Here $F_{inlet}$ is the inlet air flow to the PSA, $F_{outlet}$ is the outlet oxygen flow, $F_{exhaust}$ is the exhaust PSA pressure, $P_{high}$ is the highest inlet pressure of the compressed air stream, $P_{low}$ is the lowest vacuum on the exhaust side of PSA, and $P_{atm}$ is the atmospheric pressure. For purposes of the energy requirement calculations, it was assumed $P_{high}/P_{atm} = P_{atm}/P_{low} = 2$.

TABLE 2

Comparison of VPSA cycles

|  | Conventional VPSA, High purity | Conventional VPSA with dilution | High-recovery VPSA |
|---|---|---|---|
| Final oxygen purity | 0.95 | 0.4 | 0.4 |
| Oxygen purity after PSA | 0.95 | 0.95 | 0.4 |
| Oxygen recovery after PSA | 0.6 | 0.6 | 0.9 |
| Outlet PSA flow, MSCFD | 70.1 | 42.8 | 166.5 |
| Inlet PSA air flow, MSCFD | 528.7 | 322.4 | 352.5 |
| Exhaust PSA flow, MSCFD | 458.6 | 279.6 | 185.9 |
| Dilution air stream flow, MSCFD | 0 | 123.8 | 0 |
| Compression and vacuum energy requirement, kJ/mol | 25.6 | 15.6 | 14 |

Table 2 shows that the five step VPSA cycle described herein can allow for improved oxygen recovery relative to a convention VPSA process while also reducing or minimizing energy requirements for compression and vacuum generation. This can be due in part to the reduced amounts of input and output flow handled by the five step VPSA cycle.

Additional Embodiments

Additionally or alternately, the present invention can include one or more of the following embodiments.

Embodiment 1

A method for forming an oxygen-enriched product, comprising: exposing an input fluid comprising at least about 50% $N_2$ and about 10 vol % to about 30 vol % $O_2$ to an adsorbent at a first pressure to form an oxygen-enriched product comprising at least about 30 vol % $O_2$ (or at least about 50 vol %, or at least about 60 vol %, or at least about 70 vol %, and/or about 80 vol % or less), the adsorbent comprising an adsorbent selective for adsorption of $N_2$, the adsorbent having a first loading of $N_2$ at an end of the exposing the input fluid, the first loading optionally corresponding to a loading of $N_2$ achieved after breakthrough of $N_2$ during the exposing; (optionally) venting the adsorbent to form a first vent product at a third pressure, the first vent product having a vol % of $O_2$ greater than the vol % of $O_2$ of the input fluid, the third pressure being lower than the first pressure by at least about 0.2 bar (~20 kPa); exposing the adsorbent to a purge fluid at a second pressure to form a desorption product, the purge fluid having a vol % of $O_2$ greater than the vol % of $O_2$ of the input fluid at a second pressure, the second pressure being lower than the first pressure by at least about 0.4 bar (~40 kPa) and lower than the third pressure by at least about 0.2 bar (~20 kPa), the adsorbent having a second loading of $N_2$ at an end of the exposing the purge fluid, the second loading of $N_2$ being less than the first loading of $N_2$; and repressurizing the adsorbent to the first pressure (optionally with the input fluid), wherein a difference between the first pressure and the second pressure is less than about 4 bar (400 kPa), or less than about 300 kPa, or less than about 250 kPa, or less than about 200 kPa.

Embodiment 2

The method of Embodiment 1, wherein the adsorbent comprises a rotary wheel adsorbent.

Embodiment 3

A method for forming an oxygen-enriched product, comprising: exposing an input fluid comprising at least about 50% $N_2$ and about 10 vol % to about 30 vol % $O_2$ to at least a portion of a rotary wheel adsorbent in a first angular zone at a first pressure to form an oxygen-enriched product comprising at least about 30 vol % $O_2$ (or at least about 50 vol %, or at least about 60 vol %, or at least about 70 vol %, and/or about 80 vol % or less), the rotary wheel adsorbent comprising an adsorbent selective for adsorption of $N_2$, the at least a portion of the rotary wheel adsorbent having a first loading of $N_2$ at an end of the exposing the input fluid; exposing a purge fluid having a vol % of $O_2$ greater than the vol % of $O_2$ of the input fluid to the at least a portion of the rotary wheel adsorbent in a second angular zone at a second pressure to form a desorption product, the second pressure being lower than the first pressure by at least about 0.5 bar (~50 kPa), the at least a portion of the rotary wheel adsorbent having a second loading of $N_2$ at an end of the exposing the purge fluid, the second loading of $N_2$ being less than the first loading of $N_2$; and repressurizing the at least a portion of the rotary wheel adsorbent in a third angular zone to the first pressure (optionally with the input fluid), wherein the exposing the input fluid, the exposing the purge fluid, and the repressurizing are performed in a cycle by rotating the rotary wheel adsorbent through a plurality of angular zones, the plurality of angular zones comprising the first angular zone, the second angular zone, and the third angular zone, a pressure differential between the third angular zone and the second angular zone optionally being maintained using a brush seal.

Embodiment 4

The method of Embodiment 3, the method further comprising venting the at least a portion of the rotary wheel adsorbent in one or more additional angular zones to form one or more vent products, the one or more vent products having a pressure lower than the first pressure by at least about 0.2 bar (~20 kPa), the one or more vent products optionally comprising a first vent product, the first vent product having a pressure greater than the second pressure.

Embodiment 5

The method of any of Embodiments 1-4, wherein the first pressure is about 2.0 bar-a (~200 kPa) to about 5.0 bar-a (~500 kPa).

Embodiment 6

The method of any of Embodiments 1-4, wherein the first pressure is about 1.0 bar-a (~100 kPa) to about 3.0 bar-a (~300 kPa) and the second pressure is about 0.01 bar-a (~1 kPa) to about 0.9 bar-a (~90 kPa).

Embodiment 7

The method of any of Embodiments 1-4, wherein the first pressure and the second pressure are between about 40 kPa-a and about 200 kPa-a.

Embodiment 8

The method of any of the above embodiments, the method further comprising venting the adsorbent to form an additional vent product at the second pressure, the venting the adsorbent to form the additional vent product being performed after venting the adsorbent to form the first vent product at the third pressure and prior to exposing the adsorbent to the purge fluid.

Embodiment 9

The method of any of the above embodiments, wherein the exposing the input fluid to the adsorbent, the venting the adsorbent to form the first vent product, the exposing the adsorbent to the purge fluid, (optionally the venting the adsorbent to form an additional vent product,) and the repressurizing comprise process steps, a time length of a first process step of the process steps being different from the time length of a second process step of the process steps by 20% or less, or 15% or less, or 10% or less.

Embodiment 10

The method of any of the above embodiments, wherein a combined amount of oxygen in the oxygen-enriched product and the first vent product is at least about 50 vol % of an amount of oxygen in the input fluid (or at least about 75 vol %, or at least about 85 vol %, and/or about 95 vol % or less), or wherein a combined amount of oxygen in the oxygen-enriched product and the first vent product is at least 1 MSCF/day (or at least 10 MSCF/day) of per adsorbent bed structure, or a combination thereof.

Embodiment 11

The method of any of the above embodiments, wherein the flow of the purge fluid is counter-current relative to the flow of the input fluid and the flow of the first vent product, or wherein the purge fluid comprises at least a portion of the first vent product, or a combination thereof.

Embodiment 12

The method of any of the above embodiments, wherein the adsorbent selective for adsorption of $N_2$ comprises LiX, NaX, CaX, LiLSX, zeolite 5A, zeolite Y, zeolite Beta, or a combination thereof.

Embodiment 13

A system for forming an enriched oxygen product, comprising: a rotary wheel adsorbent comprising an adsorbent selective for adsorption of $N_2$, the rotary wheel adsorbent being mounted to rotate through a plurality of angular zones; a plurality of brush seals in contact with a surface of the rotary wheel adsorbent, the plurality of brush seals defining the plurality of angular zones, a contact of a first brush seal with the surface of the rotary wheel being suitable for maintaining a pressure difference between a first angular zone and a fourth angular zone of at least 0.2 bar (~20 kPa), a contact of a second brush seal with the surface of the rotary wheel being suitable for maintaining a pressure difference between a second angular zone and a third angular zone of at least 0.5 bar (~50 kPa); a first inlet for delivering an input fluid; a second inlet for delivering a purge fluid; one or more vent outlets; and a product outlet, at least one vent outlet optionally being in fluid communication with the second inlet.

Embodiment 14

The system of Embodiment 13, wherein the contact of the first brush seal with the surface of the rotary wheel is suitable for maintaining a pressure difference between the first angular zone and the fourth angular zone of at least 0.5 bar (~50 kPa), or wherein the contact of the second brush seal with the surface of the rotary wheel is suitable for maintaining a pressure difference between the second angular zone and the third angular zone of at least 1.0 bar (~100 kPa), or a combination thereof.

Embodiment 15

The method or system of any of the above embodiments, wherein the second pressure is less than about 80% of the first pressure, or less than about 70%, or less than about 60%, or less than about 50%.

Embodiment 16

The method or system of any of the above embodiments, wherein the input fluid comprises about 0.1 vol % to about 10 vol % $H_2O$.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for forming an oxygen-enriched product, comprising:
exposing an input fluid comprising at least about 50% $N_2$ and about 10 vol % to about 30 vol % $O_2$ to at least a portion of a rotary wheel adsorbent in a first angular zone at a first pressure to form an oxygen-enriched product comprising at least about 50 vol % $O_2$, the rotary wheel adsorbent comprising an adsorbent selective for adsorption of $N_2$, the at least a portion of the rotary wheel adsorbent having a first loading of $N_2$ at an end of the exposing the input fluid;
exposing a purge fluid having a vol % of $O_2$ greater than the vol % of $O_2$ of the input fluid to the at least a portion of the rotary wheel adsorbent in a second angular zone at a second pressure to form a desorption product, the second pressure being lower than the first pressure by at least about 0.5 bar (~50 kPa), the at least a portion of the rotary wheel adsorbent having a second loading of $N_2$ at an end of the exposing the purge fluid, the second loading of $N_2$ being less than the first loading of $N_2$; and
repressurizing the at least a portion of the rotary wheel adsorbent in a third angular zone to the first pressure, wherein the exposing the input fluid, the exposing the purge fluid, and the repressurizing are performed in a cycle by rotating the rotary wheel adsorbent through a plurality of angular zones, the plurality of angular zones comprising the first angular zone, the second angular zone, and the third angular zone.

2. The method of claim 1, the method further comprising venting the at least a portion of the rotary wheel adsorbent in one or more additional angular zones to form one or more vent products, the one or more vent products having a pressure lower than the first pressure by at least about 0.2 bar (~20 kPa).

3. The method of claim 2, wherein the one or more vent products comprise a first vent product, the first vent product having a pressure greater than the second pressure.

4. The method of claim 2, wherein the at least a portion of the rotary wheel adsorbent is repressurized in the third angular zone using the input fluid.

5. The method of claim 2, wherein a pressure differential between the third angular zone and the second angular zone is maintained using a brush seal.

6. A system for forming an enriched oxygen product, comprising:
a rotary wheel adsorbent comprising an adsorbent selective for adsorption of $N_2$, the rotary wheel adsorbent being mounted to rotate through a plurality of angular zones;
a plurality of brush seals in contact with a surface of the rotary wheel adsorbent, the plurality of brush seals defining the plurality of angular zones, a contact of a first brush seal with the surface of the rotary wheel being suitable for maintaining a pressure difference between a first angular zone and a fourth angular zone of at least 0.2 bar (~20 kPa), a contact of a second brush seal with the surface of the rotary wheel being suitable for maintaining a pressure difference between a second angular zone and a third angular zone of at least 0.5 bar (~50 kPa);
a first inlet for delivering an input fluid;
a second inlet for delivering a purge fluid;
one or more vent outlets; and
a product outlet.

7. The system of claim 6, wherein at least one vent outlet is in fluid communication with the second inlet.

8. The system of claim 6, wherein the contact of the first brush seal with the surface of the rotary wheel is suitable for maintaining a pressure difference between the first angular zone and the fourth angular zone of at least 0.5 bar (~50 kPa), or wherein the contact of the second brush seal with the surface of the rotary wheel is suitable for maintaining a pressure difference between the second angular zone and the third angular zone of at least 1.0 bar (~100 kPa), or a combination thereof.

\* \* \* \* \*